United States Patent
Heide et al.

(10) Patent No.: US 8,286,429 B2
(45) Date of Patent: Oct. 16, 2012

(54) SOLAR HYBRID COMBINED CYCLE GAS AND STEAM POWER PLANT

(75) Inventors: Stephan Heide, Dresden (DE); Uwe Gampe, Bad Gottleuba (DE); Manfred Freimark, Berlin (DE)

(73) Assignee: Technische Universitaet Dresden, Dresden (DE)

( * ) Notice: Subject to any disclaimer, the term of this patent is extended or adjusted under 35 U.S.C. 154(b) by 22 days.

(21) Appl. No.: 13/066,138

(22) Filed: Apr. 7, 2011

(65) Prior Publication Data

US 2011/0185742 A1    Aug. 4, 2011

Related U.S. Application Data

(63) Continuation of application No. PCT/EP2009/062898, filed on Oct. 5, 2009.

(30) Foreign Application Priority Data

Oct. 11, 2008    (DE) .......................... 10 2008 051 384

(51) Int. Cl.
*B60K 16/00* (2006.01)
*B60L 8/00* (2006.01)
*F03G 6/00* (2006.01)

(52) U.S. Cl. .................................... 60/641.8; 60/39.182
(58) Field of Classification Search .................. 60/641.8, 60/772, 39.182, 39.19
See application file for complete search history.

(56) References Cited

U.S. PATENT DOCUMENTS

| 5,417,052 | A | 5/1995 | Bharathan et al. |
| 5,444,972 | A | 8/1995 | Moore |
| 5,727,379 | A * | 3/1998 | Cohn .......................... 60/39.182 |
| 6,141,949 | A * | 11/2000 | Steinmann ...................... 60/772 |
| 6,694,738 | B2 * | 2/2004 | Bronicki et al. ............. 60/641.8 |
| 2006/0260314 | A1 * | 11/2006 | Kincaid et al. ............... 60/641.8 |
| 2008/0127647 | A1 * | 6/2008 | Leitner .......................... 60/645 |
| 2010/0024421 | A1 * | 2/2010 | Litwin et al. ................ 60/641.8 |

FOREIGN PATENT DOCUMENTS

| DE | 000004126036 A1 | 2/1993 |
| DE | 000004126037 A1 | 2/1993 |
| DE | 000004126038 A1 | 2/1993 |
| DE | 0000019627425 A1 | 1/1998 |
| DE | 10144841 C1 | 10/2002 |
| DE | 202008002599 U1 | 5/2008 |
| WO | WO-A-9631697 | 10/1996 |

* cited by examiner

*Primary Examiner* — William H Rodriguez
*Assistant Examiner* — Craig Kim
(74) *Attorney, Agent, or Firm* — Von Rohrscheidt Patents (57) ABSTRACT

A solar hybrid combined cycle gas-steam power plant and method including a solar unit, a gas turbine unit and a steam turbine unit. The solar unit includes a receiver. The gas turbine unit includes a gas turbine with a waste heat boiler arranged downstream, and a steam turbine with a feed water heater. The power plant includes a heat transfer medium cycle for transferring solar heat. The heat transfer medium cycle is coupled to the gas turbine unit through a gas turbine heat exchanger and to the steam turbine unit through a solar boiler. Alternatively to the gas turbine unit and the steam turbine unit, the solar hybrid combined cycle power plant includes an integrated gas-steam turbine having a waste heat boiler arranged downstream, wherein the heat transfer medium cycle is coupled to the integrated gas-steam turbine through the gas turbine heat exchanger and through the solar boiler.

21 Claims, 6 Drawing Sheets

SOLAR HYBRID COMBINED CYCLE GAS AND STEAM POWER PLANT

RELATED APPLICATIONS

This patent application is a continuation of International patent application PCT/EP2009/062898, filed on Oct. 5, 2009 claiming priority from and incorporating by reference German patent application DE 10 2008 051 384.9, filed on Oct. 11, 2008, both of which are incorporated herein by this reference.

FIELD OF THE INVENTION

The invention relates to a solar hybrid combined cycle gas and stream power plant including a solar unit, a gas turbine unit with a waste heat boiler and a steam turbine unit and a heat transfer medium cycle for utilizing solar heat. The invention further relates to a method for operating a solar hybrid combined cycle gas steam power plant with a gas turbine process and a steam turbine process, wherein solar heat is coupled into the processes through a heat transfer medium cycle.

BACKGROUND OF THE INVENTION

Environmental problems increasing worldwide, increasing energy demand and resource shortages require new technologies for power plants which on the one hand side continuously increase the overall percentage of renewable energies and on the other hand side assures continuous energy supply. The new technologies among other things include hybrid power plants which operate on various combinable and exchangeable energy sources.

Among the conventional power plants are steam power plants, gas turbine power plants and combined gas-steam power plants in which the principles of a gas turbine power plant and a steam power plant are combined. They are used for conventionally generating electrical energy from fossil fuels. In a steam power plant in which the fossil fuels are used for evaporating water, the thermal energy of the water vapor is transformed into electrical energy through a steam turbine which in turn drives a generator. In a gas turbine power plant, a gas turbine is operated with liquid or gaseous hydrocarbon based fuel like, for example, natural gas. The gas turbine itself also drives a generator for power generation. The exhaust gases of the gas turbine have high temperature and can thus be used for additionally heating a waste heat boiler in the gas-steam hybrid power plant. In a combined cycle gas-steam power plant, a gas turbine, besides directly generating electrical energy from fossil fuels, is also used as a heat source for the subsequent waste heat boiler which functions as a steam generator for the steam turbine. The steam is subsequently expanded through a conventional steam turbine process.

Besides using the waste heat of the gas turbine, the steam power and thus the electrical power of the steam turbine can be increased by additionally heating the boiler. Solar-thermal steam generation is another option for additional heating. This type of steam generation based on using solar energy is possible in the recited combination with a combined cycle gas-steam power plant, a fossil fuel steam power plant with solar heat coupling or as a standalone solar thermal power plant. In a solar thermal power plant, the radiation energy of the sun is coupled into the power plant cycle through a receiver also designated as absorber or collector and is thus being used as a primary energy source. Thus, the radiation energy of the sun is used for energy generation by focusing direct radiation through reflectors onto the solar receiver. The reflectors include surfaces concentrating the incident sunlight. The receiver or the reflectors are typically tracked after the sun. In solar tower power plants and parabolic channel power plants which are particular embodiments of solar thermal power plants, sun radiation is focused through reflectors.

Solar tower power plants are typically steam power plants with solar steam generation. A steam generator which is heated in a conventional steam power plant through fossil fuels like oil, natural gas or coal is replaced by a solar steam generation unit, a receiver or absorber on a tower. When the sun shines, automatically positioning mirrors, so-called heliostats, align so that the sunlight is reflected onto the central receiver. Therein the radiation energy is transmitted to a heat transfer medium like air, liquid salt or the process medium water/steam in the form of heat. The heated heat transfer medium is then used, for example, for generating steam in a steam turbine power plant and for subsequent electric energy generation through a generator coupled with a turbine.

The development of parabolic channel power plants which are already mostly being used in regenerative power plants and also in so-called ISCC power plants (Integrated Solar Combined Cycle) is the most advanced with respect to solar thermal power plants. Parabolic channel power plants due to the comparatively small temperature level have the advantage that heat storage for process safety can be implemented in a rather simple manner. The limited upper process temperatures, however, on the other hand side are disadvantageous for efficiency and cost. Solar operated units combined with steam cycle processes are known in the art.

DE 196 27 425 A1 discloses a hybrid solar combined cycle unit, including a gas turbine unit, a steam turbine unit, a waste heat steam generator and a solar steam generator. The unit is configured for hybrid-solar combined operation, pure solar operation and combined operation. In hybrid-solar combined operations, the solar vapor generator is used as an additional steam generator besides the waste heat steam generator. For pure solar operations and combined operations, the steam is either provided in the solar steam generator or in the waste heat-steam generator. The steam generated is respectively used for operating the steam turbine. The heat generated through solar energy is exclusively coupled into the steam process. A similar embodiment of a solar operated unit with gas and steam turbine is disclosed in U.S. Pat. No. 5,444,972 A. The solar heat coupled into the cycle of a heat transfer medium through a solar receiver is additionally provided for steam generation in the waste heat boiler besides the exhaust heat of the gas turbine. Also in this unit, the solar heat is only being used in the steam cycle.

DE 41 26 036 A1, DE 41 26 037 A1 and DE 41 26 038 A1 disclose gas and steam turbine power plants with additional devices for solar steam generation, which are respectively connected to a feed water supply of a steam turbine power plant. The device for solar steam generation according to DE 41 26 036 A1 leads into the high pressure steam conduit running from the waste heat steam generator to the steam turbine, so that the steam generated at the high pressure super heater heating surfaces of the waste heat steam generator is mixed with the steam of the solar steam generator and conducted to the steam turbine.

In the power plant disclosed in DE 41 26 037 A1 and also in the power plant disclosed in DE 41 26 038 A1 the solar steam generation unit is directly connected to the high pressure super heater heating surfaces of the waste heat steam generator. The power plant disclosed in DE 41 26 037 A1 furthermore includes a high pressure, medium pressure and low pressure steam turbine. Thus, solar steam generation is additionally connected with the medium pressure steam unit of the steam turbine process. In the recited gas and steam turbine power plants, the heat generated through a solar process is only fed to the steam turbine process.

DE 20 2008 002 599 U1 discloses a solar thermal hybrid power plant with a solar thermally heated heat transfer medium cycle and a steam/water cycle of a turbine stage thermally coupled with the steam generation stage. The steam/water cycle includes a super heater that is connected downstream of the solar thermal super heater and decoupled from the heat transfer medium cycle. The heat transfer medium cycle is closed. Thermal oil or water are being used as heat transfer media, wherein heat from the heat transfer medium is transferred in heat-exchangers to the actual steam turbine process. The power plant with solar thermal heat induction is a pure steam power plant.

Furthermore a gas turbine unit with solar heat coupled into the process is known in the art. The solar hybrid gas turbine unit is a piece of experimental equipment with a modified helicopter engine which is arranged in a solar tower and in which the combustion air is heated through solar radiation between a compressor outlet and a combustion chamber inlet. The gas turbine is arranged in the tower proximal to the receivers and thus unsuitable for larger units.

U.S. Pat. No. 5,417,052 discloses a gas and steam turbine power plant in combination with solar heat coupling into the gas turbine unit. The solar radiation energy converted into thermal energy through a solar receiver is transported through a heat transfer medium from the receiver to a heat transfer medium which is provided for heating the compressed combustion air. The air heated through solar energy is subsequently supplied to the combustion chamber. The solar heat generated is thus exclusively coupled into the gas process.

Solar thermal power plants either in combination with steam turbine units or in combination with gas turbine units are known in the art, but they have various disadvantages. Thus, high process temperatures and thus high percentages of solar heat induction combined with different primary energies can only be facilitated on a limited basis. The desired high process temperatures furthermore counteract an option to store heat so that mostly fossil fuels have to be used for heating when there is low solar radiation. On the other hand side low process temperatures cause low efficiency. For high process temperatures in turn, only a small percentage of the heat induction into the hybrid power plant can be implemented. For these reasons so far a disadvantageous compromise is made between high process temperature, solar portion of heat induction and supply safety or supply quality with respect to electric energy.

Furthermore the use of gas turbine units with solar heat coupled into the process is limited to small units as long as the gas turbine has to be positioned proximal to the receiver.

BRIEF SUMMARY OF THE INVENTION

Thus, it is an object of the present invention to provide a unit and a method which facilitate heat transfer and coupling of solar heat into a process of a natural gas and steam power plant, wherein in the locations for absorbing solar heat and coupling the heat into the process are spatially separated from one another. In order to reduce the consumption of fossil fuels, a high percentage of the heat required for the process shall be provided from solar energy.

This object is achieved according to the invention through a solar hybrid gas and steam power plant including a solar unit with a receiver, a gas turbine unit with a compressor, a combustion chamber and a gas turbine with a waste heat boiler connected downstream of the gas turbine and a steam turbine unit with a steam turbine and a feed water pre heater. The gas turbine unit and the steam turbine unit are coupled with one another through the waste heat boiler and the feed water pre heaters arranged therein. The gas turbine is operated with liquid or gaseous hydrocarbon-based fuel. The steam turbine is used for expanding water vapor. Besides the feed water heater an additional economizer, an evaporator or a super heater and additional heat exchangers for heat extraction can be provided in the waste heat boiler.

According to the invention solar heat generated through an additionally integrated heat transfer medium cycle is transmitted to the power plant process, wherein the heat transfer medium cycle is coupled through a gas turbine heat exchanger with the gas turbine unit and through a solar boiler with the steam turbine unit.

According to an alternative embodiment of the invention the solar hybrid natural gas and steam power plant includes a solar unit with a receiver and an integrated gas-steam turbine with a subsequently connected waste heat boiler instead of the gas turbine unit with gas turbine and the steam turbine unit with steam turbine. The additionally integrated heat transfer medium cycle transfers solar heat, wherein the heat transfer medium cycle is coupled through the gas turbine heat exchanger and through the solar boiler with the integrated gas-steam turbine.

With an integrated gas-steam turbine the gas turbine process is operated as an integrated gas steam process. Thus, super heated steam is mixed with the gas of the gas turbine process before entering the integrated gas-steam turbine or the compressor air is saturated with water vapor.

The turbines according to the invention drive at least one generator, wherein the turbines in combination with a generator can be configured as single shaft units or can be configured as multi shaft units in combination with plural generators. In single shaft units advantageously clutches are being used which facilitate separate operations and separate start up and shut down of the turbines. Single shaft units due to only using one generator come with lower investment.

The waste heat boiler of the gas turbine unit and the solar boiler of the heat transfer medium cycle can be advantageously integrated in series with and also parallel to one another into the steam turbine unit.

According to an exemplary embodiment of the invention a heat transfer medium flows within the heat transfer medium cycle which is configured closed. Gases like air, carbon dioxide, helium or nitrogen can be used as heat transfer media according to the invention. It is advantageous that the gaseous heat transfer medium can be pressure loaded, this means that the pressure in the heat transfer cycle is above ambient pressure. Furthermore the pressure level is controllable between 1 and 20 bars through a pressure control unit. The higher the pressure, the higher the volumetric heat capacity and the density of the gases. Thus, operating at higher pressure has the advantage of using transport conduits with significantly lower diameter than, for example, operating at ambient pressure.

Known units are operated, for example, with molten salt with high heat capacity. The salt, however, on the one hand side can have a detrimental corrosive effect and on the other hand side there is the risk of solidification in the transfer conduits. When using a gaseous heat transfer medium these disadvantages do not occur.

According to the invention the heat transfer medium cycle includes at least one recirculation blower that can be arranged in various positions in the cycle.

The receiver of the heat transfer medium cycle is preferably configured as a tower receiver in which solar energy is transferred to the heat transfer medium. Thus, it is facilitated to introduce heat into a conventional gas and steam power plant, wherein the heat is generated at advantageously high temperatures which can be reached in tower power plants.

The gas turbine heat exchanger configured as a thermal connection between the heat transfer medium cycle and the gas turbine unit is preferably arranged between the compressor and the combustion chamber of the gas turbine unit and in flow-direction directly after the receiver of the heat transfer medium cycle.

According to an embodiment of the invention the heat transfer medium cycle additionally includes short-term heat storage devices in the high temperature section between the tower receiver and the gas turbine heat exchanger for compensating short term variations of the solar radiation. Due to the highly reduced temperature gradients the use of the short-term heat storage devices can, for example, positively influence the control properties of the gas turbine and the service life of the components of the unit.

Advantageously an additional high temperature heat exchanger with an additional circulation blower is integrated within the heat transfer medium cycle. The high temperature heat storage device can advantageously store the heat received by the heat transfer medium in the tower receiver.

The energy of the heat exchangers facilitates balancing and regulating the heat absorbed from solar energy in an advantageous manner for the entire unit, in that the missing portion of the heat converted from solar energy is balanced by stored heat. Otherwise the heat deficit has to be compensated by supplying fuel into the gas turbine process.

The heat transfer medium cycle is operatively influenced in a customary manner through valves and bypasses. According to an exemplary embodiment of the invention the heat transfer medium cycle includes a bypass about a gas turbine heat exchanger so that in particular the temperature of the heat transfer medium in flow direction is controlled after the gas turbine heat exchanger. According to the mass flow of the heat transfer medium and the temperature difference of the gas turbine heat exchanger, the temperature of the heat transfer medium, in spite of the heat transfer, is higher than the compressor exit temperature of the gas turbine. The bypass about the gas turbine heat exchanger on the one hand side can reheat the cooled down mass flow of the heat transfer medium or on the other hand side it can also be used separately, for example, for overheating water vapor. A high entry temperature of the heat transfer medium into the solar boiler which is advantageously above 500° C. can now be used for steam generation in the solar boiler subsequently arranged downstream. Thus, the solar boiler is thus configured as a complete boiler with a heat exchanger which is flowed through by the heat exchanger medium within the heat exchanger cycle, wherein heat is transferred from the heat exchanger medium to the water vapor cycle or the steam process.

For a constant operation of the steam turbine process, this means maintaining a constant entry temperature and a constant mass flow of the heat exchanger medium into the solar boiler, heat can be transferred through the gas turbine heat exchanger to the gas turbine process as a function of the solar radiation. The varied solar radiation is compensated through fuel introduction in the gas turbine process.

In the solar hybrid gas and steam power plant according to the invention an economizer is arranged in an exemplary embodiment in the waste heat boiler and also in the solar boiler, wherein the feed water for the steam turbine process is pre heated in the economizers.

According to an alternative embodiment of the invention an economizer is only arranged in the waste heat boiler, wherein the feed water for the steam process is preheated in the economizer and subsequently divided between the evaporators in the solar boiler and between the waste heat boiler. Thus, the division of the entire mass flow of the feed water between the conduit to the evaporator and the conduit to the solar boiler and to the evaporator in the waste heat boiler is continuously variable in an advantageous manner.

While the mass flow to the waste heat boiler remains substantially constant the mass flow to the solar boiler can be zero up to a multiple of the mass flow to the waste heat boiler. The variation of the total mass flow is provided by the boiler feed pump.

According to an exemplary embodiment of the invention the steam turbine process additionally includes an intermediary super heater which is configured to be integrated in the solar boiler or in the heat transfer medium cycle and also within the waste heat boiler. According to the invention the intermediary super heater can be connected in series with or parallel to the super heater. During intermediary super heating additional heat is advantageously provided to the already partially expanded steam of the steam turbine, for example, in the super heater of the heat transfer medium cycle. Intermediary heating causes a significant increase of the work performed in the cycle process and of the energy generation and simultaneously reduces the specific consumption of heat generated by fuels. In the context of the solar boiler this leads to a significant increase of the solar heat contribution in power generation.

The method according to the invention for operating the solar hybrid combined cycle gas and steam power plant with a gas and steam turbine process is characterized in that solar heat is coupled through a heat transfer medium cycle including a gas turbine heat exchanger and a solar boiler into the gas turbine process and also into the steam turbine process.

For further reference a gas and steam turbine process is a combined gas and steam turbine process as it is being used in a combined gas-steam power plant or it is an integrated gas-vapor process with an integrated gas-steam turbine.

According to the invention a gas turbine is operated in the gas turbine process and a steam turbine is operated in the steam turbine process, wherein the turbines drive at least one generator.

According to an alternative embodiment of the invention the gas turbine process is operated as an integrated gas-steam process, for example, as STIG (steam injected gas turbine process), HAT (humid air turbine) process or EVGT (evaporative gas turbine) process with an evaporation gas turbine. Thus, the steam that is generated and super heated in the solar boiler or in the waste heat boiler is advantageously mixed with the gas either in flow direction between the compressor and the gas turbine heat exchanger, between the gas turbine heat exchanger and the combustion chamber or after the combustion chamber. This alternative embodiment of the invention is advantageous in particular for using units in a lower or medium power range based on low investment cost. Since the steam volume that can be generated in the waste heat boiler is limited, it is also advantageous for integrated gas-steam arrangements to increase the steam generation through solar heat.

Another advantage of jointly using a feed water pre-heater and an economizer is a low exhaust gas temperature. Since the water included in the exhaust gas is expensive the de-ionized water and should therefore not exit the process with the exhaust gas, the low exhaust gas temperature saves a large portion of the cooling required to condense the de-ionized water.

The gaseous heat transfer medium flows within a closed heat transfer medium cycle and advantageously flows under a superimposed positive pressure, wherein the pressure level of the gaseous heat transfer medium which is advantageously between 1 and 20 bars is controlled from the outside through a pressure control unit.

According to the invention the temperature of the heat transfer medium is advantageously controlled in flow direction after the gas turbine heat exchanger and in front of the solar boiler between 500° C. and 600° C. through the mass flow through the bypass about the gas turbine heat exchanger arranged in the heat transfer medium cycle.

According to an alternative embodiment of the invention in which an economizer is only arranged in the waste heat boiler and the feed water of the steam process pre heated in the economizer is divided between the evaporator in the solar boiler and the evaporator in the waste heat boiler, the division of the mass flow of the feed water between the evaporators is advantageously controlled in a continuously variable manner.

According to another embodiment of the invention an additional process generating electric energy or an associated heat exchanger can be arranged in flow direction of the heat transfer medium in the heat transfer medium cycle downstream of the economizer of the solar boiler. The integrated process that generates electrical energy can be advantageously operated, for example, according to the principle of the Organic-Rankine-Cycle (ORC). ORC units are steam power generation units which are operated with organic operating media instead of water in order to use the waste heat from low temperature processes.

Besides the additionally integrated electric power generation process, a heat transfer medium of an absorption cooling unit, a process steam generation unit or a heat supply unit can be arranged in the heat transfer medium cycle.

According to a preferred embodiment of invention, the pressure level in the waste heat boiler is controlled according to a variable pressure operating mode according to incident solar heat during power plant operation.

The steam process can be advantageously configured as a multi-pressure process, wherein the solar boiler and the waste heat boiler can be configured as multi-pressure boilers. The different pressure levels for a three pressure process are typically between 130 and 140 bars in a first stage, between 50 and 60 bars in a second level stage, and approximately 10 bars in a third pressure stage. The method according to the invention for operating the solar combined cycle the gas and steam power plant as a multi-pressure system also facilitates loading only the solar boiler with high pressure, while the waste heat boiler is operated on a low pressure level or on plural pressure levels.

It is appreciated that the solar hybrid gas and steam power plant according to the invention and the method for operating have significant advantages over the prior art The invention facilitates a significant increase of the heat potion converted from solar energy, and therefore saves fossil fuel over the known units and methods. This facilitates a very effective and resource saving control of the variable solar heat supply through various heat storage devices and facilitates the variable supply of fuel to the combustion chamber of the gas turbine unit. This also provides full availability of the power plant over long periods of time and a higher annual efficiency, compared to prior art power plants, through the utilization of solar energy.

The high temperatures of the operating fluid at the turbine inlet, in particular the gas turbine inlet and the associated high outlet temperatures of the heat transfer medium from the solar radiation receiver which are achieved through a tower receiver, facilitate high-efficiency for the overall unit.

The gaseous heat transfer medium that is run in the closed heat transfer medium cycle will not solidify when the unit stops and will therefore not impede the flow in the pipes through deposits. Contamination is also minimized through the closed configuration of the cycle.

Through heat transfer using a heat transfer medium cycle the invention facilitates an advantageous installation of the power plant components, in particular the turbine units, proximal to the ground.

Furthermore configuring the components of the solar cycle or of the heat transfer medium cycle is advantageously provided so that current technology and also future machinery and equipment can be integrated into the power plant cycle in a simple manner, since the heat transfer medium cycle is independent from the remaining power plant process.

BRIEF DESCRIPTION OF THE DRAWINGS

Further details, features and advantages of the invention can be derived from the subsequent description with reference to the associated drawing figures in which simplified schematics of the solar hybrid power plant are illustrated with a solar heat transfer cycle in drawing figures, wherein.

DETAILED DESCRIPTION OF THE INVENTION

Figure 1:
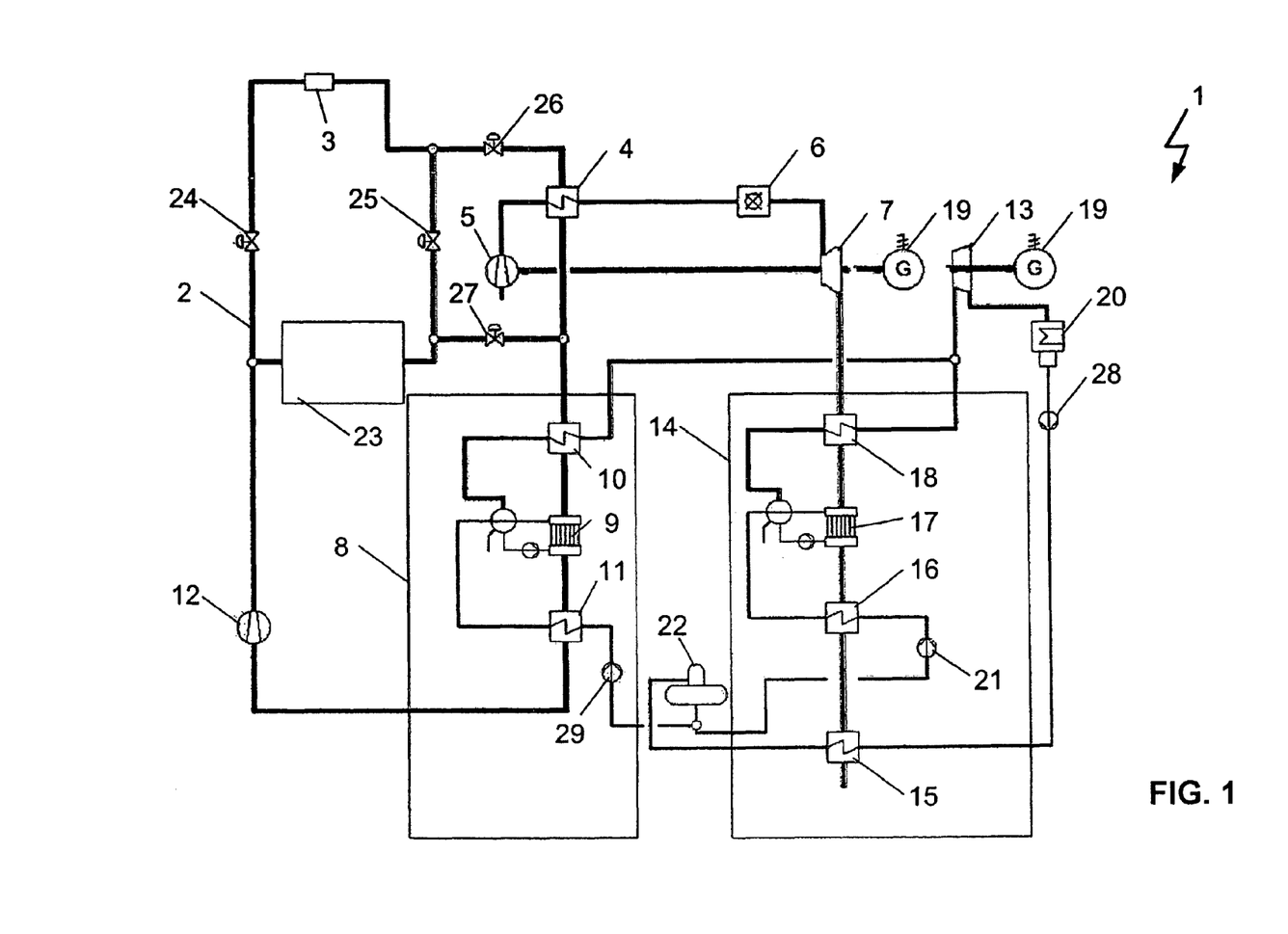
FIG. 1 illustrates the gas and steam power plant with one respective economizer in a solar boiler and in a waste heat boiler.

FIG. 1 illustrates the simplified schematic of a solar hybrid combined cycle gas and steam power plant 1 with a primary solar heat transfer medium cycle 2 with one respective economizer 11, 16 in the solar boiler 8 and in the waste heat boiler 14 in which the feed water for a steam turbine unit is preheated. The power plant essentially includes a gas turbine unit with a compressor 5, a combustion chamber 6 and a gas turbine 7 with a waste heat boiler 14 arranged downstream which also represents a component of the steam turbine unit. The hot exhaust gas of the gas turbine 7 is used in the waste heat boiler 14 for generating superheated steam. Parallel thereto the steam can also be provided in the solar boiler 8. Additional heat is supplied in a super heater 10, 18 to water that is evaporated at saturation temperature in an evaporator 9, 17. Additional heating of the steam increases the temperature and the specific volume of the steam so that it is superheated. From the solar boiler 8 and from the waste heat boiler 14 steam flows through conduits into the steam turbine 13 in which the fluid volume of the steam is reduced since work is being performed. The steam mass flows from the solar boiler 8 and the waste heat boiler 14 are mixed before they enter the steam turbine 13. Like the gas turbine 7 also the steam turbine 13 is coupled with a generator 19 which converts mechanical power into electrical power. Subsequently the expanded and cooled steam flows into a steam turbine condenser 20 in which it condenses through heat transfer to the ambient air. The condensed water is conducted through the condensate pump 28 and subsequently through the feed water preheater 15 and the waste heat boiler 14 of the gas turbine 7 and thus preheated. Furthermore the temperature of the waste gas of the gas turbine is reduced. This advantageously increases the efficiency of the unit. The heated feed water is stored in an intermediary manner in the feed water container 22. Subsequently the water is supplied through feed pumps 21, 29 to the solar boiler 8 and the waste heat boiler 14 again.

The solar heat transferred to the closed heat transfer medium cycle 2 is transferred according to the invention through the gas turbine heat exchanger 4 to the gas turbine process and through the evaporator 9 to the super heater of the solar boiler 8 to the steam turbine process. The gaseous heat transfer medium like air, carbon dioxide, helium or nitrogen flows according to the invention under a positive pressure which is applied from the outside through a pressurization unit. The circulation blower 12 causes a pressure differential and thus a flow of the heat transfer medium. When necessary and when the heat transfer medium cycle 2 is configured accordingly additional circulation blowers and valves for blocking or controlling the heat transfer medium cycle can be placed at other positions of the heat transfer medium cycle. Due to the lowest specific energy input requirements and material saving temperatures the circulation blower 12 is advantageously arranged at the coldest location of the heat transfer medium cycle 2.

According to an advantageous embodiment of the invention the solar energy is transmitted within a receiver, in particular a tower receiver 3, as heat to the heat transfer medium. A portion of the heat absorbed by the heat transfer medium in the tower receiver 3 is transmitted to the gas turbine unit in the gas turbine heat exchanger 4 which is arranged between the compressor 5 and the combustion chamber 6 of the gas turbine unit and which is arranged in flow direction downstream of the tower receiver 3 of the heat exchanger cycle 2. Thus, the heat transfer medium flows through the valve 26, wherein the valves 25, 27 are closed. The combustion air compressed by the compressor 5 is advantageously heated in a gas turbine heat exchanger 4 and supplied in heated condition to the combustion chamber 6. This way the specific consumption of heat generated by fuel is reduced in the gas turbine process.

For a closed valve 26 the hot heat transfer medium flows according to the invention through the valves 25, 27 directly to the solar boiler 8. Advantageously the temperature of the heat transfer medium and thus the portions of the mass flow through the valve 26 or the valves 25, 27 can be controlled in flow direction downstream of the gas turbine heat exchanger 4 through the bypass.

While the gas turbine heat exchanger 4 establishes a connection between the heat transfer medium cycle and the gas turbine unit, the solar boiler 8 with the integrated evaporator 9 and the super heater 10 connect the heat transfer medium cycle 2 with the steam turbine unit. According to the invention heat is transferred in the super heater 10 from the hot heat transfer medium to the steam which is thus advantageously superheated. Thus, the heat transfer medium is cooled down. Heat is transferred on the downstream flow path from the heat transfer medium within the evaporator 9 and the economizer 11 to the steam.

For better temperature control in the heat transfer medium cycle 2 the solar heat absorbed by the heat transfer medium in the tower receiver 3 can be stored within the high temperature heat exchanger 23. The stored energy is advantageously used to compensate variations of the heat transferred from solar energy through respective regulation. The stored energy can be supplied as required when the heat transfer medium flows through the high temperature heat exchanger 23 and the valves 25 or 27. Simultaneously the valve 24 can be closed at least partially.

According to an alternative embodiment of the invention heat can also be stored within the water vapor cycle of the steam turbine unit.

Figure 2:
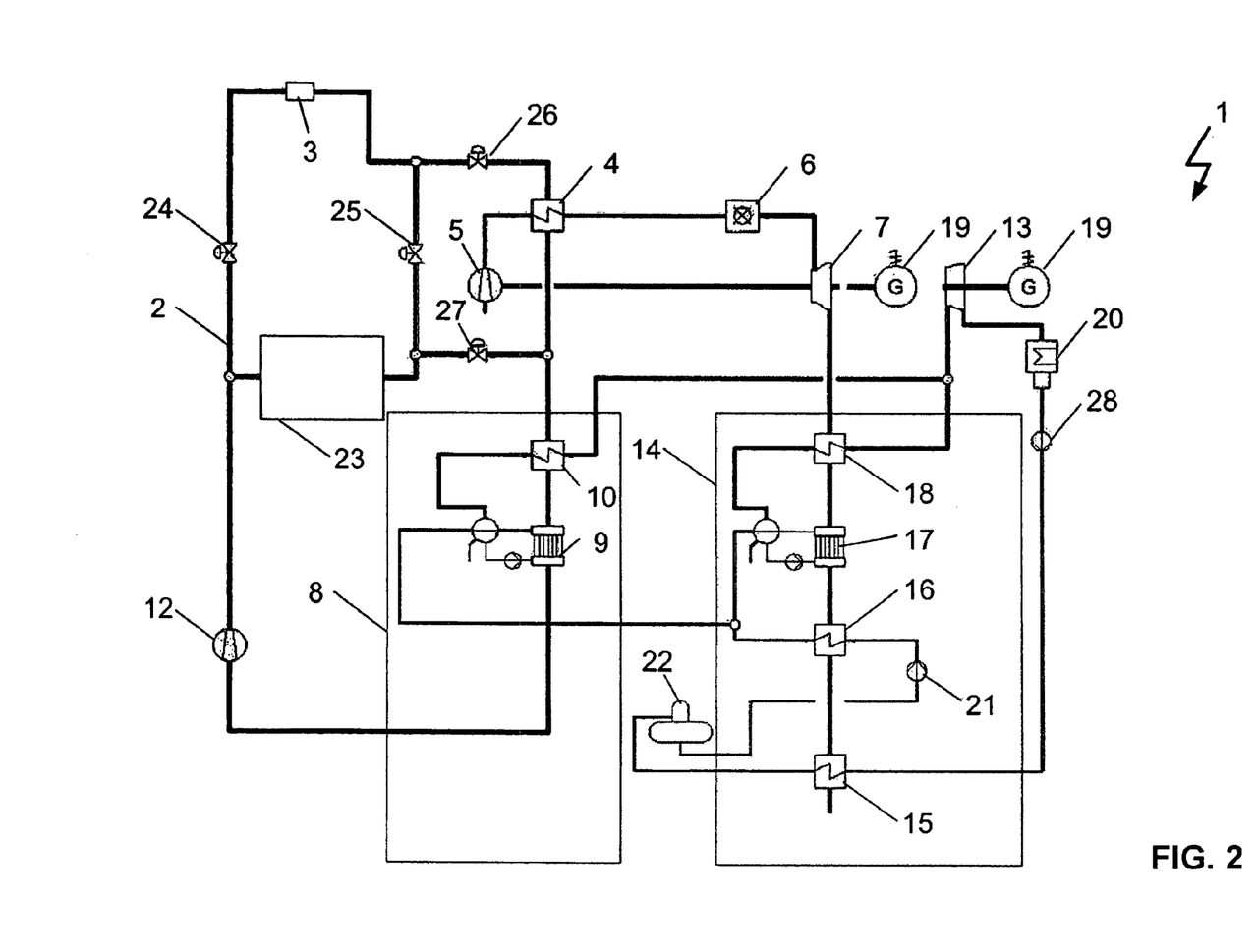
FIG. 2 illustrates the gas and steam power plant with an economizer exclusively in the waste heat boiler.

FIG. 2 illustrates a simplified embodiment of the solar hybrid gas and steam power plant 1 with a primary solar heat cycle 2, wherein only the economizer 16 is provided for preheating the feed water of the steam turbine unit. The difference to the diagram according to FIG. 1 is that the feed water is only preheated in the waste heat boiler 14. An additional joint economizer 16 in the waste heat boiler 14 facilitates additionally reducing the temperature of the exhaust gas of the gas turbine unit, thus increasing the efficiency of the gas turbine unit.

According to the invention the feed water preheated in the economizer 16 can be distributed to the evaporators 9 in the solar boiler 8 and the evaporators 17 in the waste heat boiler 14, wherein the portioning between the conduit for the entire mass flow of the feed water to the evaporator 9 in the solar boiler 8 and to the evaporator 17 and the waste heat boiler 14 can be controlled in a continuously variable manner. Thus, the variable heats of the exhaust gas of the gas turbine system and of the heat transfer medium can be advantageously balanced.

Figure 3:
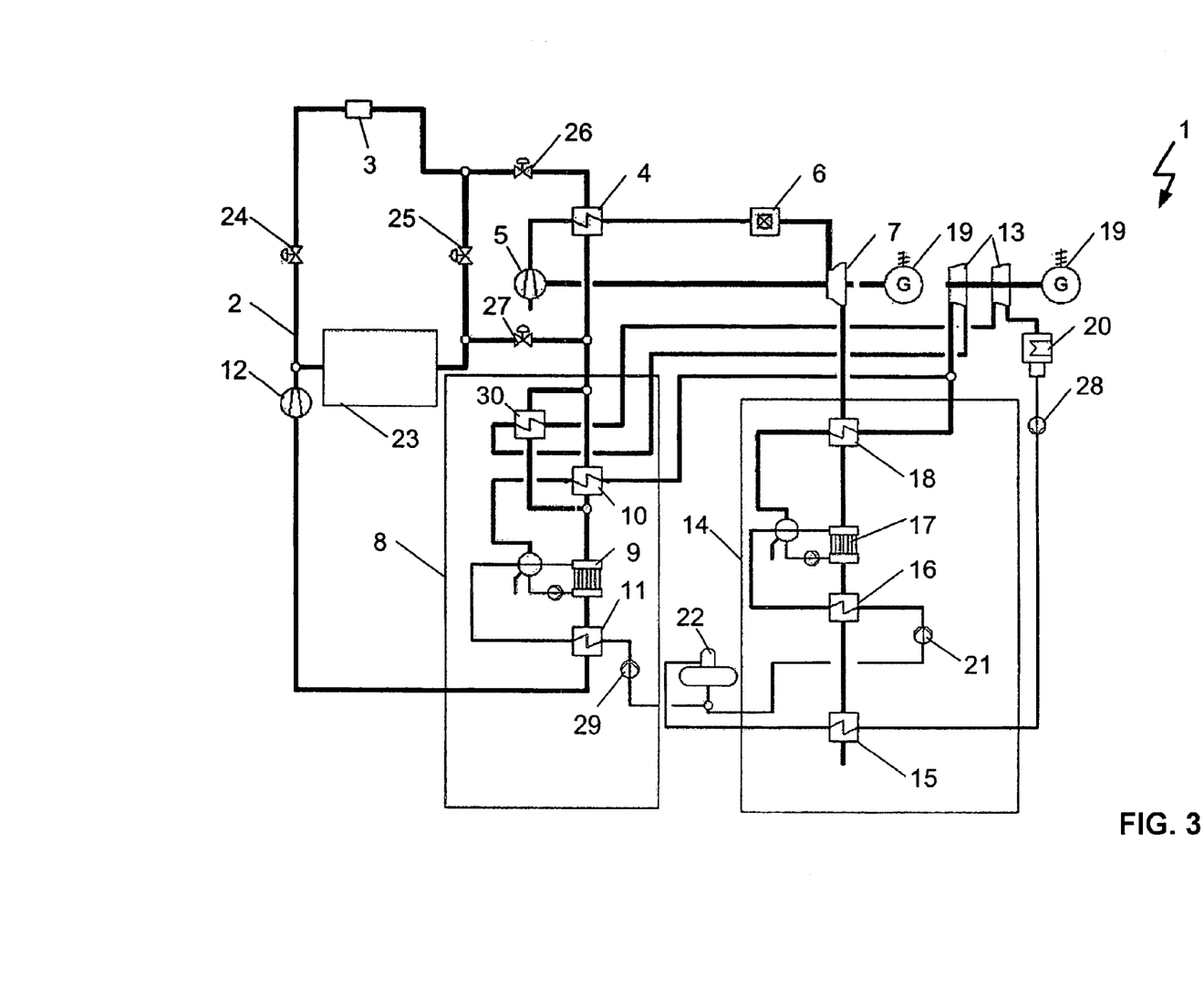
FIG. 3 illustrates the gas and steam power plant with one respective economizer in the solar boiler and in the waste heat boiler and intermediary steam superheating in the steam process in the solar boiler.
Figure 4:
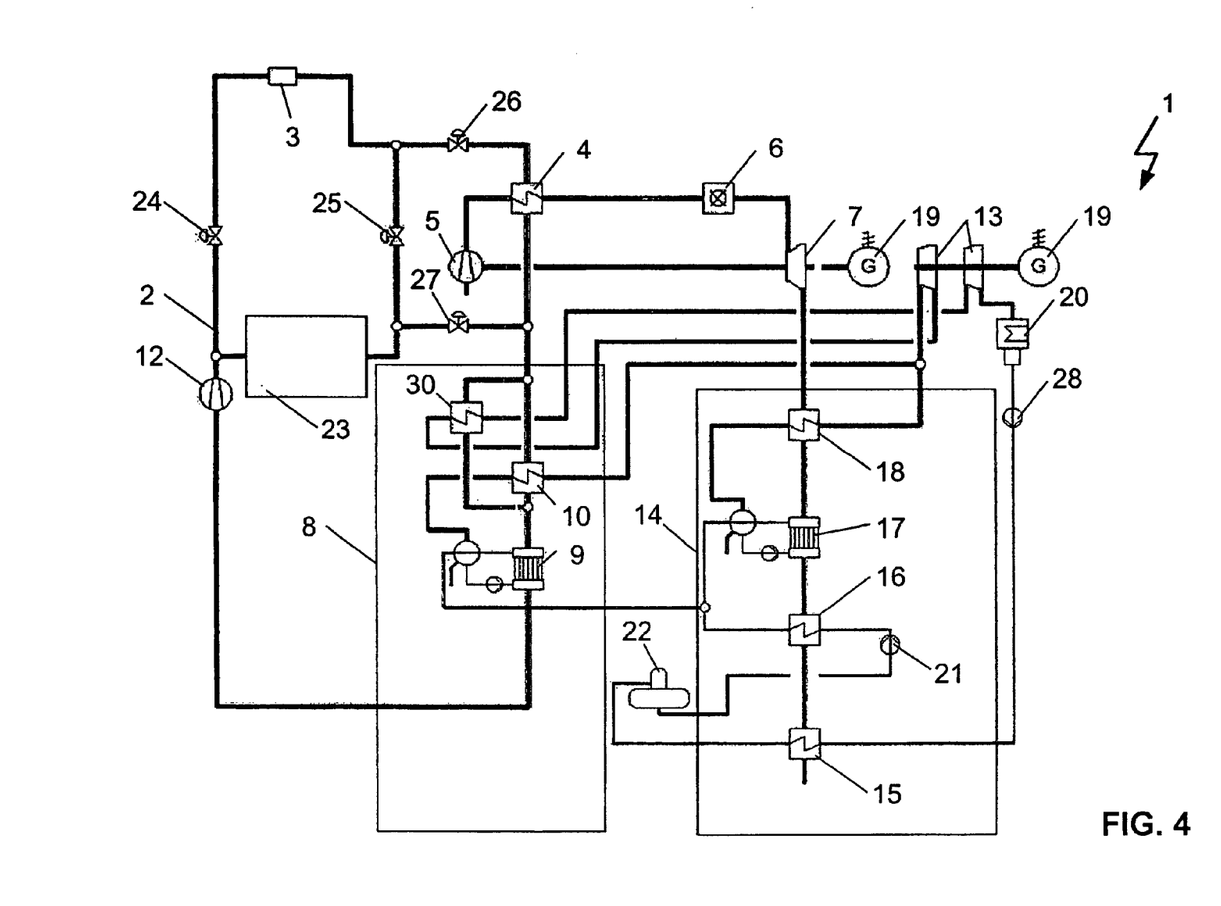
FIG. 4 illustrates the gas and steam power plant with an economizer exclusively in the waste heat boiler and intermediary superheating of the steam in the steam power process in the solar boiler.

FIGS. 3 and 4 illustrate the solar hybrid combined cycle gas and steam power plant 1 according to the invention with a primary solar heat transfer medium cycle with an advantageous configuration for intermediary superheating of the steam in the solar boiler 8. The intermediary superheating can be performed with separate economizers 11, 16 in the solar boiler 8 and in the waste heat boiler 14 according to FIG. 3 and also with a common economizer 16 in the waste heat boiler 14 according to FIG. 4.

The already partially expanded steam of the steam turbine 13 is additionally supplied with heat in the intermediary super heater 30 through the heat transfer medium of the heat transfer medium cycle 2. The intermediary super heater 30 whose heating surfaces are configured, for example, as heating surfaces that are intertwined with the heating surfaces of the super heater 10 is connected according to the invention in the heat transfer medium cycle 2 and parallel with the super heater 10. The intermediary super heater 30 and the super heater 10 can also be connected in series with one another.

For an operating mode without solar heat or stored heat, thus without intermediary super heating the steam advantageously flows through a bypass conduit of the steam turbine 13 (not illustrated in the figures).

Intermediary superheating causes a significant increase of the work performed by the cycle process and increases power production and simultaneously reduces the specific consumption of heat generated by fuel. In combination with the solar boiler this namely leads to a significant increase of the solar heat portion in power generation.

Figure 5:
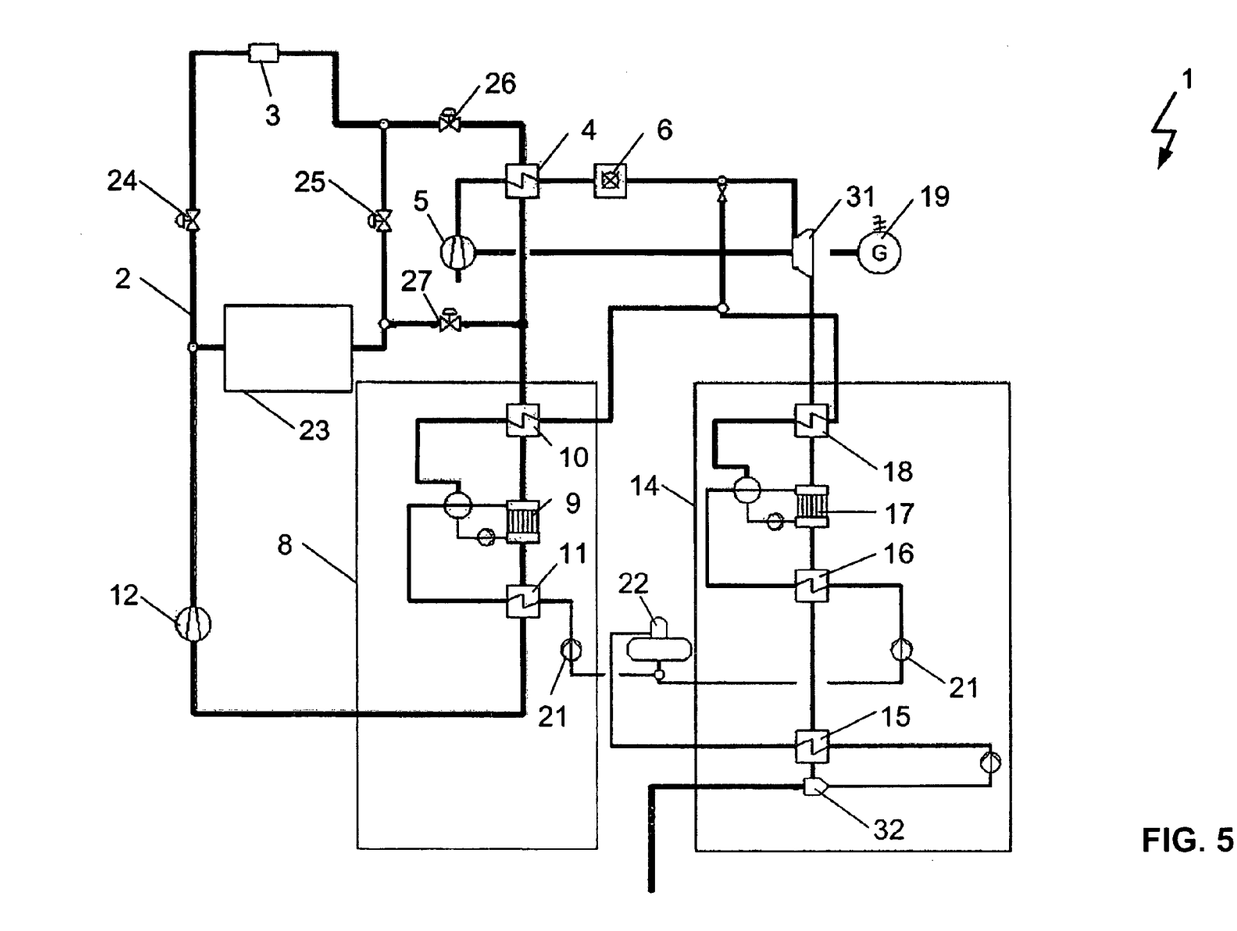
FIG. 5 illustrates an integrated gas-steam power plant with a respective economizer in the solar boiler and in the waste heat boiler.
Figure 6:
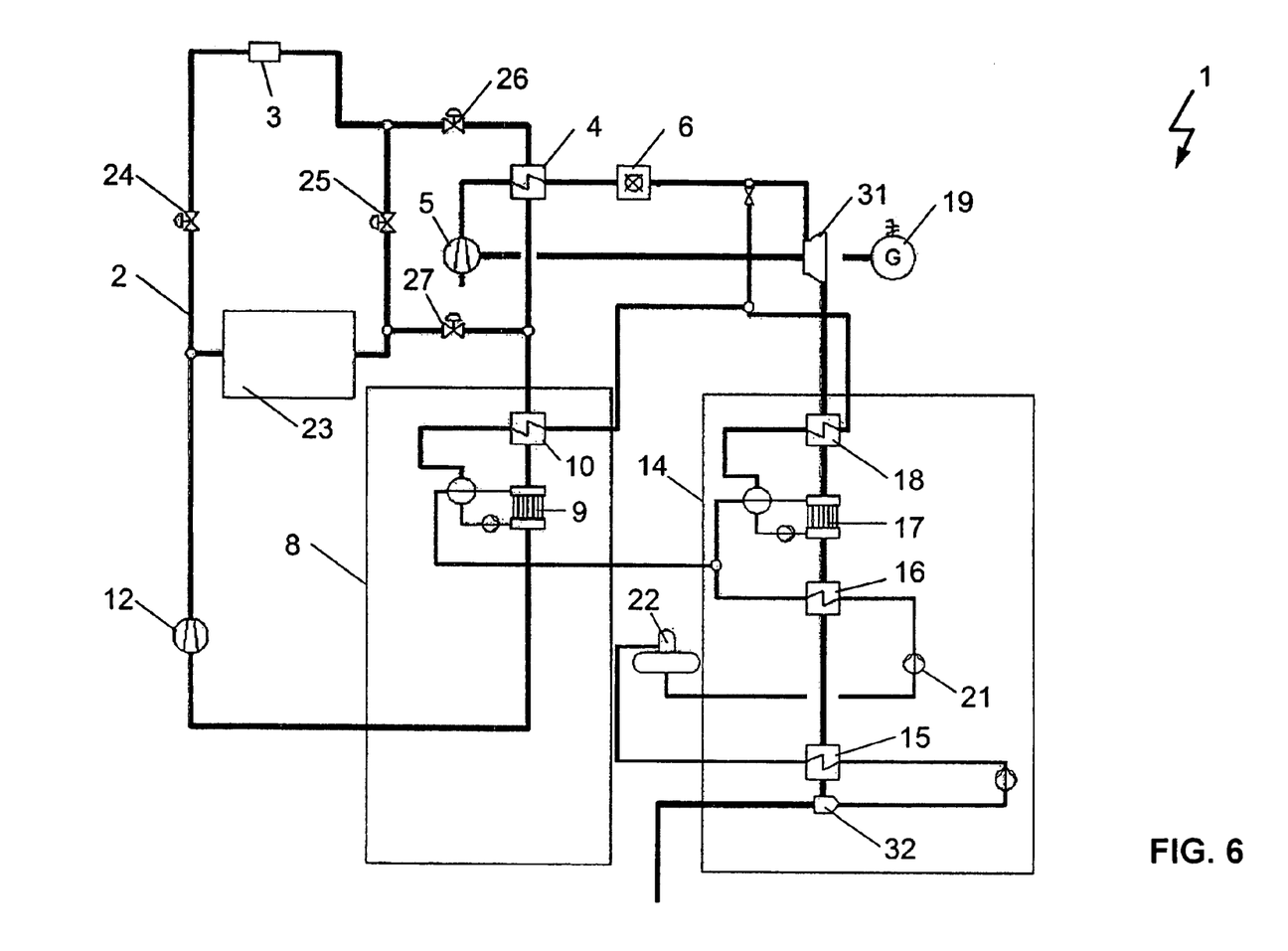
FIG. 6 illustrates an integrated gas-steam power plant with an economizer exclusively in the waste heat boiler.

FIGS. 5 and 6 illustrate the solar hybrid gas and steam power plant 1 according to the invention with a primary solar heat transfer medium cycle 2 with an advantageous configuration of the steam induction or steam supply to the integrated gas-steam turbine 31. Also the schematics of FIGS. 5 and 6 differ with respect to the arrangement of the economizers 11 and 16 as already described for the preceding figures.

According to the schematic diagrams of FIGS. 5 and 6 the original gas turbine unit is also operable in an integrated gas-steam process. Thus, the superheated steam generated according to the invention in the solar boiler 8 or in the waste heat boiler 14 is mixed in upstream of the turbine. A separate steam turbine 13 can be omitted. According to FIGS. 5 and 6 mixing heated air and heated steam according to the invention is performed between the steam turbine heat exchanger 4 and the combustion chamber 6. Other options for a mixing location are provided between the compressor 5 and the gas turbine heat exchanger 4 and after the combustion chamber 6.

Operating with a common economizer 16 in the waste heat boiler 14 according to FIG. 6 has additional significant advantages. For example de-ionized water that has been produced with great expense is re-used in the water-steam cycle in the integrated gas-steam process. The de-ionized water flows without additional equipment in the power plant process together with the exhaust gas flow into the atmosphere and is thus disadvantageously removed from the power plant process. Only using additional exhaust gas side cooling devices like, for example, a condensation unit 32 can facilitate a condensation of the de-ionized water from the exhaust gas. However, when there is an option according to the invention on the one hand side to generate additional steam in a solar boiler 8 and on the other hand side to implement operations with a common economizer 16 in the waste heat boiler 14, the exhaust gas is already cooled down significantly quicker than in conventional units. The complexity of additional cooling for condensing the de-ionized water from the exhaust gas is thus significantly reduced.

In an exemplary embodiment of the invention units with very energy efficient gas turbines with a high compression ratio and low exhaust gas temperatures are provided. With low exhaust gas temperatures superheating steam in the waste heat boiler 14 is not possible at all or only possible within very much reduced limits since the temperature level of the exhaust gas is too low. According to the invention the waste heat boiler 14 can then only be operated with the economizer 16 and the evaporator 17, wherein superheating the steam is performed entirely or partially in the super heater 10 of the solar boiler 8.

Another embodiment of the invention relates to solar steam generation in the solar boiler 8 which are connectable according to FIGS. 1-6 parallel to the waste heat boiler 14. Alternatively solar steam generation can also be connected in series with the waste heat boiler 14. Depending on the temperature level the water of the steam turbine unit in the waste heat boiler 14 would be evaporated and superheated in the solar boiler 8.

Reference Numerals and Designations
    1 Solar hybrid combined cycle gas and steam power plant
    2 Heat transfer medium cycle
    3 Receiver/tower receiver
    4 Gas turbine heat exchanger
    5 Compressor
    6 Combustion chamber
    7 Gas turbine
    8 Solar boiler
    9 Evaporator
    10 Super heater
    11 Second Economizer
    12 Circulation blower
    13 Steam turbine
    14 Waste heat boiler
    15 Feed water preheater
    16 First Economizer
    17 Evaporator
    18 Super heater
    19 Generator
    20 Steam turbine condenser
    21 Boiler feed pump
    22 Fee water container
    23 High temperature heat storage
    24, 25, 26, 27 Valve
    28 Condensate pump
    29 Boiler feed pump
    30 Intermediary heat exchanger
    31 Integrated gas-steam-turbine
    32 Condensation system

What is claimed is:

1. A solar hybrid combined cycle gas and steam power plant comprising:
    a solar unit;
    a gas turbine unit; and
    a steam turbine unit, wherein the solar unit includes a receiver,
    wherein the gas turbine unit includes a gas turbine with a waste heat boiler arranged downstream of the gas turbine,
    wherein the steam turbine unit includes a steam turbine with a feed water pre-heater,
    wherein the solar hybrid combined cycle gas and steam power plant further includes a heat transfer medium cycle for transferring solar heat,
    wherein the heat transfer medium cycle is coupled with the gas turbine unit through a gas turbine heat exchanger and coupled with the steam turbine unit through a solar boiler, and
    wherein the gas turbine heat exchanger is arranged within the gas turbine unit between a compressor and a combustion chamber, and within the heat transfer medium cycle downstream of the receiver.

2. The solar hybrid combined cycle gas and steam power plant according to claim 1, wherein the heat transfer medium cycle is configured as a closed cycle and gases are being used as heat transfer media.

3. The solar hybrid combined cycle gas and steam power plant according to claim 1, wherein the receiver is configured as a tower receiver.

4. The solar hybrid combined cycle gas and steam power plant according to claim 1, wherein the heat transfer medium cycle includes a bypass about the gas turbine heat exchanger.

5. The solar hybrid combined cycle gas and steam power plant according to claim 1, wherein a first economizer is arranged in the waste heat boiler.

6. The solar combined cycle hybrid gas and steam power plant according to claim 1, wherein a second economizer is arranged in the solar boiler.

7. The solar hybrid combined cycle gas and steam power plant according to claim 1, wherein the steam turbine unit includes an intermediary super heater.

8. The solar hybrid combined cycle gas and steam power plant according to one claim 1, wherein the heat transfer medium cycle includes a high temperature heat storage.

9. A solar hybrid combined cycle gas and steam power plant comprising:
- a solar unit; and
- an integrated gas-steam turbine,
- wherein the solar unit includes a receiver,
- wherein the integrated gas-steam turbine includes a waste heat boiler that is connected downstream of integrated gas-steam turbine,
- wherein a heat transfer medium cycle is provided for transferring solar heat,
- wherein the heat transfer medium cycle is coupled through a gas turbine heat exchanger and a solar boiler with the integrated gas-steam turbine, and
- wherein the gas turbine heat exchanger is arranged within the gas turbine unit between a compressor and a combustion chamber, and within the heat transfer medium cycle downstream of the receiver.

10. The solar hybrid combined cycle gas and steam power plant according to claim 9, wherein the heat transfer medium cycle is configured as a closed cycle and gases are being used as heat transfer media.

11. The solar hybrid combined cycle gas and steam power plant according to claim 9, wherein the receiver is configured as a tower receiver.

12. The solar hybrid combined cycle gas and steam power plant according to claim 9, wherein the heat transfer medium cycle includes a bypass about the gas turbine heat exchanger.

13. The solar hybrid combined cycle gas and steam power plant according to claim 9, wherein a first economizer is arranged in the waste heat boiler.

14. The solar combined cycle hybrid gas and steam power plant according to claim 9, wherein a second economizer is arranged in the solar boiler.

15. The solar hybrid combined cycle gas and steam power plant according to claim 9, wherein the steam turbine unit includes an intermediary super heater.

16. The solar hybrid combined cycle gas and steam power plant according to one claim 9, wherein the heat transfer medium cycle includes a high temperature heat storage.

17. A method for operation a solar hybrid combined cycle gas and steam power plant with a gas and steam turbine process, comprising:
- wherein the solar hybrid combined cycle gas and stream power plant includes a solar unit comprising a receiver for providing solar heat, a waste heat boiler arranged downstream of a gas turbine, a feed water pre-heater coupled to a steam turbine,
- coupling the solar heat into a gas turbine process; and
- coupling the solar heat into a steam turbine process through a closed heat transfer medium cycle including a gas turbine heat exchanger and a solar boiler,
- wherein the gas turbine heat exchanger is arranged within the gas turbine unit between a compressor and a combustion chamber, and within the heat transfer medium cycle downstream of the receiver.

18. The method according to claim 17, wherein a gaseous heat transfer medium flows within the closed heat transfer medium cycle under a provided positive pressure and the pressure level of the gaseous heat transfer medium is being controlled.

19. The method according to claim 17, wherein a temperature of the heat transfer medium in a flow direction downstream of the gas turbine heat exchanger is controlled through a bypass arranged in the closed heat transfer medium cycle about the gas turbine heat exchanger.

20. The method according to claim 17,
- wherein feed water for the steam turbine process preheated in a first economizer of a waste heat boiler is divided between an evaporator in the solar boiler and an evaporator in the waste heat boiler, and
- wherein dividing the mass flow of the feed water between the evaporators is controlled in a continuously variable manner.

21. The method according to claim 17, wherein a pressure level in the waste heat boiler is controlled as a function of the solar heat according to a variable pressure principle.

* * * * *